Figure 1:
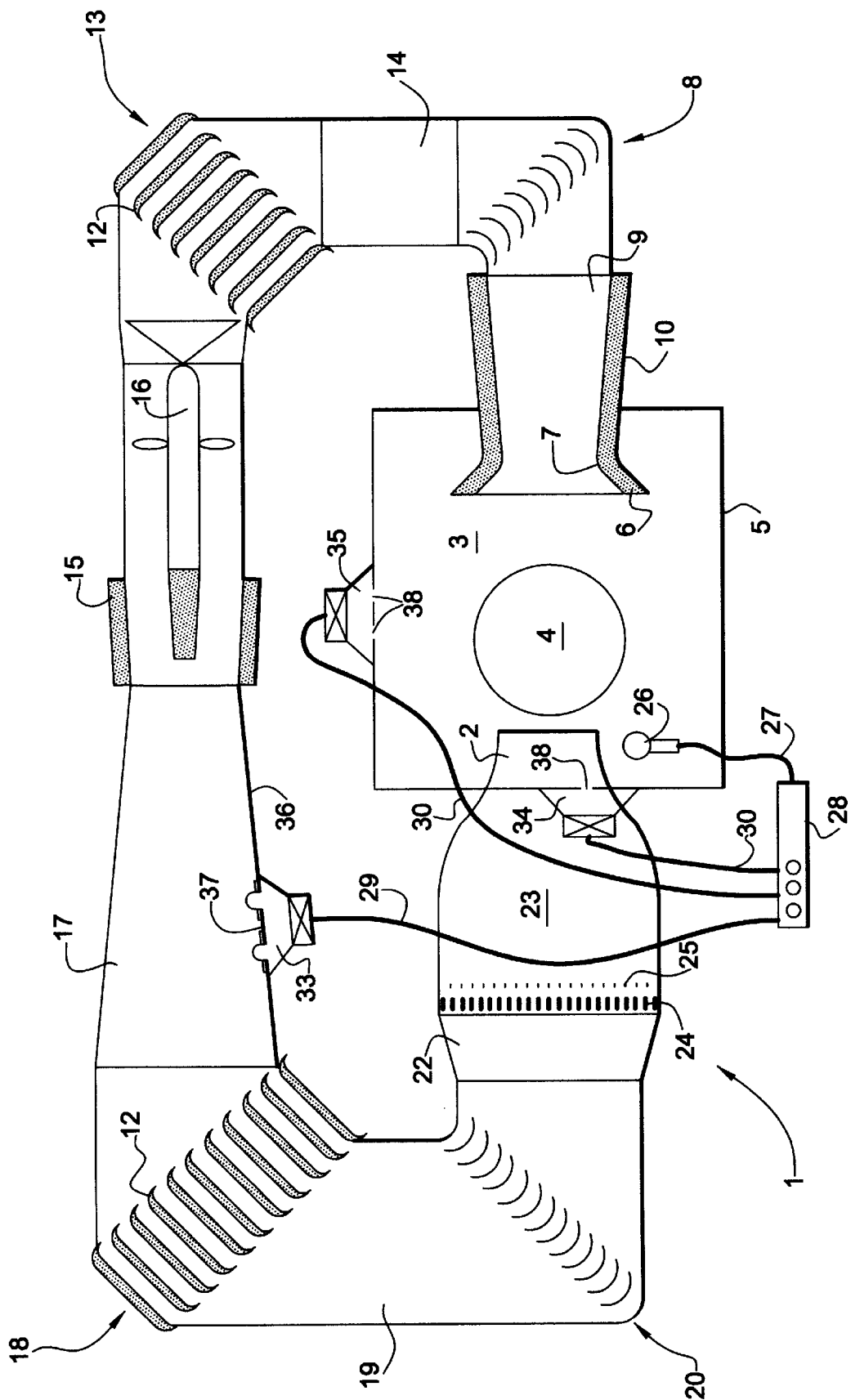

United States Patent [19]
Wickern et al.

[11] Patent Number: 6,155,111
[45] Date of Patent: *Dec. 5, 2000

[54] WIND TUNNEL WITH AIR VIBRATION PHASE CANCELLATION

[75] Inventors: Gerhard Wickern, Gaimersheim; Steffen Wallmann, Chemnitz; Wilhelm Von Heesen, Catrop-Rauxel, all of Germany

[73] Assignee: Audi AG, Ingolstadt, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/159,491

[22] Filed: Sep. 23, 1998

[51] Int. Cl.⁷ ................................................. G01M 9/00
[52] U.S. Cl. ................................................................ 73/147
[58] Field of Search ............................ 73/147, 178 R, 73/170.11, 170.13, 861.43, 861.52, 861.58, 865.6; 138/45, 46

[56] References Cited

U.S. PATENT DOCUMENTS

| | | | |
|---|---|---|---|
| 2,043,416 | 6/1936 | Lueg | 179/1 |
| 5,025,659 | 6/1991 | Starr, Jr. et al. | 73/147 |
| 5,435,175 | 7/1995 | Kramer | 73/147 |

FOREIGN PATENT DOCUMENTS

| | | |
|---|---|---|
| 4224488 | 1/1994 | Germany . |
| 19526098 | 9/1996 | Germany . |
| 2-115510 | 4/1990 | Japan . |

OTHER PUBLICATIONS

"Active Control of Sound and Vibration" by C.R. Fuller and A.H. von Flotow, 0272–1708/95$04.00©1995IEEE, IEEE Control Systems, pp. 9–17, Dec. 1995.

"Wanden im Porsche Windkanal" by Von Winfried Eckert, Jorg Dieter Vagt und Burkhard Wolff, ATZ Automobiltechnische Zeitschrift 92 (1990), pp. 286–297 (no mo.).

"Askustik Windkanal Von BMW Ruhe Im Sturn" by Von Wolf–Heinrich Hucho, mot–Technik, pp. 144–152, 20/1989. (no mo.).

"Adaptive–Wall Wind Tunnel" by NASA Tech Brief, Ames Research Center, Moffett Field, California, p. 569, Jul., 1998.

Primary Examiner—William Oen
Attorney, Agent, or Firm—Lalos & Keegan; Michael N. Lau

[57] ABSTRACT

A wind tunnel consisting of a closed loop passageway including a test station and an impellor for producing an air stream through such passageway, a device for detecting the standing sound wave of such air stream at the test station and control means responsive to such standing sound wave for propagating at least one sound wave of a selected phase at a point in such air stream to nullify such standing sound wave.

7 Claims, 2 Drawing Sheets

WIND TUNNEL WITH AIR VIBRATION PHASE CANCELLATION

The invention relates to a wind tunnel, in particular a wind tunnel for aero-acoustic measurements with closed air path and a free jet working section, measures being taken to prevent or at least reduce disruptive air vibrations.

For example, the wind tunnels with closed air path and free jet working section employed chiefly in the automotive industry (the so-called Goettinger design) have inherent in them the disadvantage, due to the design principle, that at certain air speeds low-frequency air vibrations develop which may cause the tunnel to resonate like an organ pipe. The excitation is caused by periodic eddies in the free jet which in turn are intensified by vibration of the air column. Typical frequencies range from 1 to 7 Hz, that is, fall within a range which, while not audible, may be critical to the supporting structure of the building (wind tunnel), as experience has demonstrated.

In addition, audible noises may also occur. The ring vortices periodically emanating from the wind tunnel jet, for example, impinge on the collecting cone at varying speeds of flow and generate a flow noise modulated by the vortical frequency. To be added is that the ring vortex also induces speed fluctuations on the axis of the jet, so that modulation of the flow noises may also occur at the test object.

Vortex formation at the nozzle can be disrupted by turbulence generators in order to interrupt the feedback mechanism between air column vibration and periodic ring vortices. So-called Seiferth vanes, for example, are widely used. Such turbulence generators are, of course, unsuitable for use in an acoustic wind tunnel (that is, in a wind tunnel with extremely low intrinsic noise), since they generate high intrinsic noise by virtue of their function.

Significant improvement can also be achieved by suitable design of the air collecting element (collecting cone) adjoining the working section (DE 42 24 488 A1). However, the attenuation of the coupling between ring vortex and air column resonance thereby achieved is not sufficient in all instances adequately to suppress the disruptive vibration. This applies in particular to test speeds at which the blowing frequency coincides exactly with a resonance frequency in the tunnel.

DE 29 41 404 B1 discloses a measure enabling conduct of three-dimensional measurements free of interference. There is proposed for this purpose a working section in wind tunnels with a ductile wall enclosing the model positioned a specific distance from this wall, the latter consisting of a material with a low modulus of elasticity and having a large number of adjustable supports distributed externally along the length and over its cross-section.

DE 38 36 376 A1 proposes a measure for prevention or reduction of the wind tunnel interferences caused by the working section walls; the contour of the wall is suitably adapted, in such a way that adaptation takes place in only one plane and in two dimensions.

In both instances only the pertinent stationary pressure distribution is affected; any air column oscillations present cannot be affected or reduced.

The object of the invention is to devise an especially effective measure convertible at low cost in wind tunnels, a measure by means of which disruptive air vibrations, especially ones of low-frequency, can be prevented or at least si reduced.

The solution claimed for the invention is presented in claim 1.

The invention accordingly suppresses tunnel resonance by actively affecting the (acoustic) pressure field. Variation in the pressure of the air column can be detected by a microphone, after which one (or more) loudspeaker(s) is (are) actuated in antiphase. Inasmuch as a standing wave is involved in the event of a disruptive air vibration, the loudspeaker system may be installed at any point in the wind tunnel or in the working compartment. Preferably, however, this is done where the pressure bulges of the air column vibration are situated. It is also essential for the loudspeaker diaphragm to be installed in the outer wall of the tunnel in such a way that the volume of the tunnel is modified by the movement of this diaphragm.

The basic procedure followed in reducing noise with active systems (sound absorption) is of the state of the art (cf. ATZ Automobiltechnische Zeitschrift 94 (1992), No. 2. pp. 88–93). Use of loudspeakers with aero-acoustic automotive wind tunnels is also of the state of the art, but in a different context (cf. ATZ Automobiltechnische Zeitschrift 96 (1994), No. 7/8, pp. 438–446, especially p. 444, lefthand column, section 3.3).

Another advantage of the proposed solution is represented by the fact that air flow entirely without disruptions is made possible by directly affecting the pressure field. This applies equally to acoustic and fluidic disturbances (noise and turbulence). Hence the invention is of importance both to aero-acoustic automotive wind tunnels and in general to wind tunnels in which high requirements are set for the quality of flow, e.g., for development of new bearing surface profiles.

In an advantageous development of the invention an array of a plurality of loudspeakers may be employed rather than a single loudspeaker in order to achieve the necessary output, in which case all loudspeakers may be operated in phase.

When a loudspeaker is installed in the area of the tunnel wall, the coupling may be effected by way of an intermediate diaphragm mounted flush with the wall.

When a loudspeaker is installed in the area of the working section, the coupling may be effected by way of an intermediate volume, in which case the area of penetration of the working section may be distinctly smaller than the mounting surface of the loudspeaker. The acoustic lining of the working section may be largely retained as a result. The acoustic output of the layout can even be increased by suitable design of the intermediate volume (bandpass housing, for example).

The microphone signal may be lowpass filtered so that only the infrasound component is affected. Various control algorithms in the sound absorption area may be used for operation (such as closely coupled monopoles). The control variable may be received in the working section and in the other tunnel walls by way of one or more microphones.

In order to affect the sound field use may also be made of "exotic" sound sources such as controlled release of compressed air, fans with fast control by way of valve systems, or loudspeakers of special design.

The invention is described in what follows with reference to exemplary embodiments. In the acompanying drawing FIG. 1 is a schematic representation (top view) of a wind tunnel of a design as claimed for the invention, FIG. 2 a schematic "evolution" of the wind tunnel presenting an example of the progression of a standing wave, FIG. 3 a loudspeaker layout preferably used in the area of a tunnel wall, FIG. 4 a loudspeaker layout preferably used in the area of a working section wall.

A wind tunnel 1, of dimensions such that it is suitable, for example, for conduct of measurements for passenger automobiles, has connected to an air discharge nozzle 2 a working section 3 designed as a free jet working section, with a rotating platform on which the test object may be placed. The working section 3 is relatively spacious and is provided with low reflection limiting walls which enclose a section of the air discharge nozzle 2 and a funnel 6 collecting the free jet, in addition to the working section 3.

A diffusor 9 extending to a first deflecting corner 8 is mounted, by way of a narrow point 7, downstream from the collecting funnel 6, a point which has an aperture angle, for example, of 45°. Collecting funnel 6, narrow point 7, and diffusor 9 are lined with a sufficiently thick layer of sound absorbing materials (such as open-pore foam plastic, slag wool).

Another tunnel section 14 extends from the deflecting corner 8 to another deflecting corner 13 which is outfitted with sliding block sound absorbers 12 and is accordingly damped. Farther downstream is a fan unit 16 (axial blower) which is also damped (by sheathing 15); beyond the fan unit 16 is a diffusor 17 which extends to another deflecting corner 18 also damped by sliding block sound absorbers 12.

Adjoining another straight tunnel section 19 is the last deflecting corner 20, again followed by a steep-angle diffusor 22 and by a nozzle prechamber 23, mounted upstream from the nozzle 2, with various built-in elements such as rectifier 24, turbulence network 25, etc., for steadying the air flow.

In the process claimed for the invention a microphone 26 is now mounted inside the working section 3 in the area of the air discharge nozzle 2 (above it, for example) and is connected by way of line 27 to a control/amplifier unit 28. Lines 29, 30, 31 lead from the latter to loudspeaker units 33, 34, 35, which are connected on a tunnel wall 36 in the area of the diffusor 17 downstream from the axial blower 16 or on the limiting wall 5 of the working section 3. A suitable microphone may, of course, also be mounted inside the air path of the wind tunnel 1, as for example in the diffusor 17.

In the case of the loudspeaker unit 33 sound is transmitted by way of an intermediate diaphragm 37 mounted flush with the wall, and by way of wall openings 38 in that of loudspeaker units 34, 35. If low-frequency (e.g., 1–7 Hz) air column oscillations (standing wave 39; see FIG. 2) are now detected by microphone 26, the control/amplifier unit 28 performs appropriate signal processing accompanied by antiphase excitation of loudspeaker units 33–35 to generate "antisound."

Figure 2:
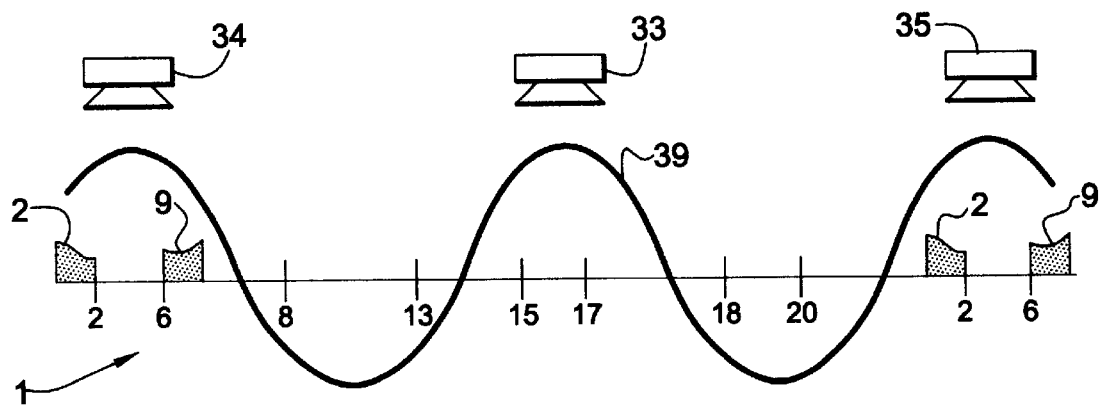

An example of the standing wave 39 formed in the wind tunnel 1 is given in a schematic representation in FIG. 2. The reference numbers given relate to the positions of the individual elements of the wind tunnel 1 described in conjunction with FIG. 1.

Figure 3:
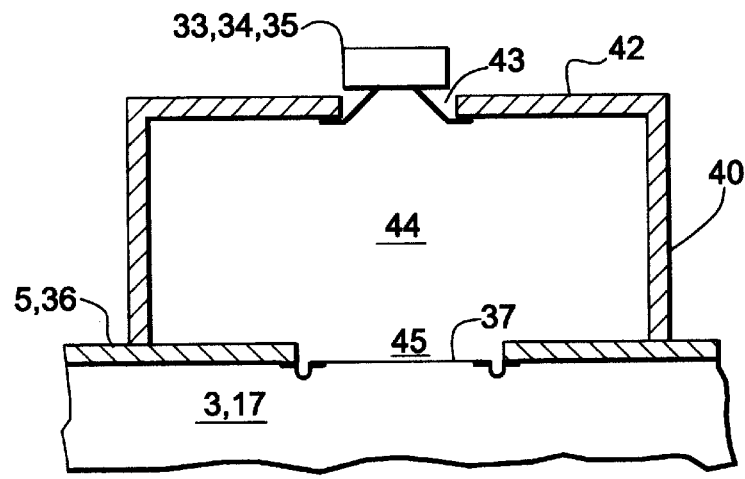
Figure 4:
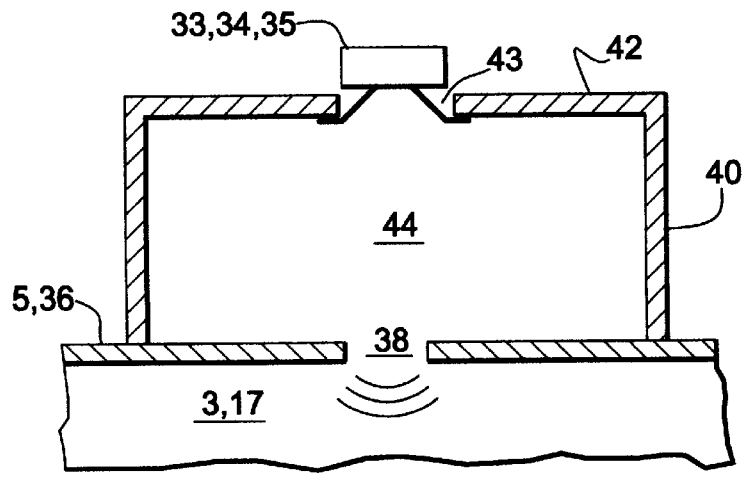

FIGS. 3 and 4 illustrate alternative embodiments with respect to the layout of the loudspeaker units 33–35. For example, there is mounted on the tunnel wall 36 or the limiting wall 5 of working section 3 a loudspeaker housing 40 the rear wall 42 of which receives loudspeaker unit 33–35 in a recess 43. An intermediate volume 44 is thereby formed. Now while, as is shown in FIG. 3, an access opening 45 into the interior of the tunnel (diffusor 17, for example) or into working section 3 is covered by intermediate diaphragm 37 (sheet aluminum, CFK, for example), the wall access opening 38 of the exemplary embodiment shown in FIG. 4 is distinctly smaller, so that, for example, any acoustic lining present in this area may be preserved to the greatest extent possible and interrupted as little as possible.

What is claimed is:

1. A wind tunnel in connection with a free jet working section forming a closed air path circulating therein disruptive air vibrations having various phases, wherein at least one device is installed in each of the wind tunnel and the free jet working section to introduce air vibrations with phases opposite to the various phases.

2. A wind tunnel as claimed in claim 1, wherein the at least one device is mounted in an area having a pressure bulge due to the disruptive air vibrations.

3. A wind tunnel as claimed in claim 1, wherein at least one loudspeaker is mounted on each of a working section limiting wall and a tunnel wall.

4. A wind tunnel as claimed in claim 3, wherein an intermediate diaphragm is flush with the wall.

5. A wind tunnel as claimed in claim 3, wherein at least one wall opening is adjacent to the loudspeaker.

6. A wind tunnel as claimed in claim 3, wherein mounted on the tunnel wall are a loudspeaker housing forming therein an intermediate volume, and a recess (43) in a rear wall for accommodating the loudspeaker.

7. A wind tunnel as claimed in claim 3, wherein a microphone is mounted in one of an area adjacent to an air discharge nozzle and inside the air path of the wind tunnel, and wherein an amplifier is connected to the microphone and to the at least one loudspeaker.

\* \* \* \* \*